United States Patent [19]

Lawrence

[11] 3,909,786

[45] Sept. 30, 1975

[54] DIGITAL TELECOMMUNICATIONS SWITCHING SYSTEMS

[75] Inventor: Gerald Norman Lawrence, Coventry, England

[73] Assignee: The General Electric Company Limited, London, England

[22] Filed: May 28, 1974

[21] Appl. No.: 473,449

[30] Foreign Application Priority Data

May 29, 1973 United Kingdom............... 25336/73

[52] U.S. Cl........................... 340/147 C; 340/147 R

[51] Int. Cl.[2]....................................... H04M 11/00

[58] Field of Search........... 179/18 E, 18 EA, 2 TV, 179/2 DP; 340/147 C

[56] References Cited

UNITED STATES PATENTS 3,573,377 4/1971 Anderson......................... 179/2 TV

*Primary Examiner*—Harold I. Pitts
*Attorney, Agent, or Firm*—Kirschstein, Kirschstein, Ottinger & Frank

[57] ABSTRACT

A switching system for a digital telecommunications exchange handling data, telex or speech signals in digital form. The switching system comprises a series of stages which may, for example, be a time-space-time sequence. Where a communication path cannot be established immediately on application of an incoming request, because of some incompatibility between the input and output signalling systems for example, it is desirable to reserve a path while the incompatibility is being resolved. This is achieved according to the invention by setting up the path connections in all but one of the switching stages. The remaining connection is preferably withheld by disabling its selection rather than disabling the path itself.

4 Claims, 4 Drawing Figures

DIGITAL TELECOMMUNICATIONS SWITCHING SYSTEMS

BACKGROUND OF THE INVENTION

1. Field of the Invention

This invention relates to digital telecommunications switching systems; that is to say, to telecommunications switching systems adapted to handle data, speech signals, or the like in digital form.

SUMMARY OF THE INVENTION

1. Description of the Prior Art

The reservation of a path through a telecommunications switching system is a desirable facility in circumstances where the two stages of a call, the setting up of a path and the transmission of information, are subject to an indeterminate delay between the two. In such cases it is undesirable that the call shall be considered established until the second stage is initiated. In one such proposal of the prior art the call is an audio transmission and the audio path establishment was required to be delayed until an accompanying video transmission path was set up. In this case the audio path was "reserved," i.e. closed to further seizure but not entirely completed as a transmission path.

The method of achieving this reserved path status was not, however, suitable for a digital system and relied upon premature cessation of selection pulses to inhibit the path completion, and quite separately, a "busying" of the output line by the auxiliary (video) control system. The reservation of a path in this way is impracticable in a digital system, in which the present invention finds application.

2. Purposes of the Invention

One object of the invention is to provide the facility for reserving a path through such a switching system.

According to the invention, a digital telecommunications switching system comprises a plurality of digital switching stages, connected in series, and control means for reserving a path through said system between a chosen input channel and a chosen output channel by setting all but one of said switching stages in their respective states appropriate to connecting said path.

It will be appreciated that the reserved path may subsequently be completed by the control means, when it is required, by setting the remaining switching stage into its appropriate state.

Said switching stages may comprise space-division or time-division switching devices, or a combination of both, arranged, for example, in a time-space-time switching configuration.

In a particular switching system in accordance with the invention, each said switching stage comprises; a switching memory containing a plurality of words; means for reading said words from the memory; and decoding means responsive to each word as it is read so as to cause a connection to be set up within the switching stage, said connection being determined by an address contained within that word. It will be seen that a path can therefore be set up through the system by writing an appropriate address into an appropriate word of the switching memory of each switching stage. In such a particular switching system, said control means is conveniently arranged to reserve a particular path through the system by writing an address into a word of the switching memory of each said switching stage, as appropriate to setting up said path, but leaving a predetermined item of data in a predetermined position within one of those words, which item causes the associated said decoding means to be inhibited when that word is read, thereby preventing that decoding means from completing said path.

In a preferred form of the invention, the last of said switching stages in said series comprises a time-division switching device arranged to receive a time-division multiplexed signal, containing data from a plurality of said input channels time-division multiplexed together in respective time slots, and to read data from any chosen one of said time slots into a chosen one of said output channels. In this form, said control means may conveniently be arranged to reserve a particular path through the system to a chosen output channel via a particular one of said time slots, by setting all the preceding switching stages into their respective states appropriate to setting up said particular path, but preventing the time-division switching device from reading data from said particular time slot into the chosen output channel.

In a particular embodiment of said preferred form of the invention, said time-division switching device conveniently comprises: a switching memory containing a plurality of words, corresponding respectively to said time slots, each of which words can hold an address identifying one of said output channels; means for reading said words cyclically, in synchronism with said time slots; and decoding means responsive to each word as it is read from the memory so as to cause data from the corresponding time slot to be read into one of the output channels as identified by the address contained in that word. In such a particular embodiment, said control means may conveniently be arranged to reserve a particular path through the system to a chosen output channel via a particular one of said time slots, by: setting all the preceding switching stages into their respective states appropriate to setting up said particular path; and writing the address identifying the chosen output channel into the word of the switching memory corresponding to said particular time slot, but leaving a predetermined item of data in a predetermined position within that word, which item causes said decoding means to be inhibited when that word is read, thereby preventing data from being read from said particular time slot and thus preventing completion of said path.

BREIF DESCRIPTION OF THE DRAWINGS

One digital telecommunications switching system will now be described, by way of example, with reference to the accompanying drawings, of which:

DESCRIPTION OF THE PREFERRED EMBODIMENT

Figure 1:
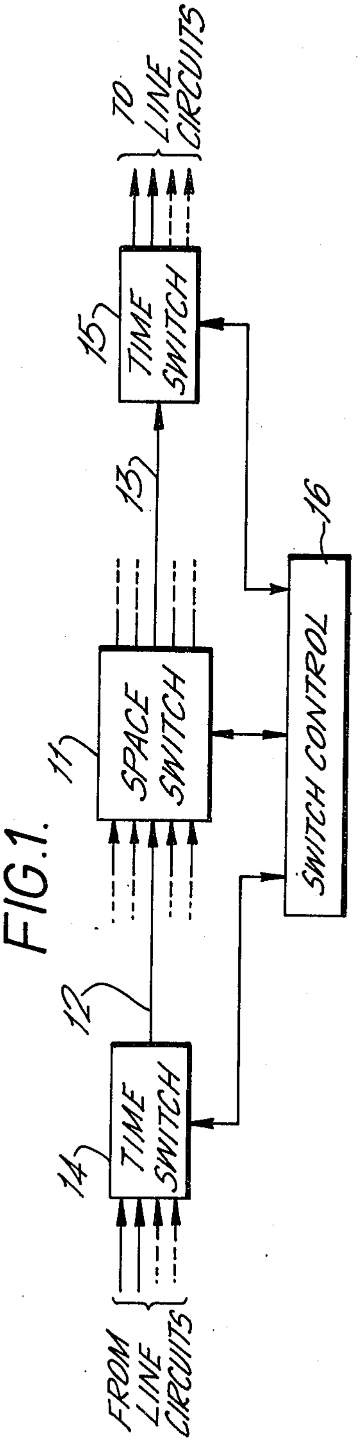
FIG. 1 is a schematic block diagram of the switching system.

Referring to FIG. 1, the switching system comprises a space-division switching device 11 (hereinafter referred to as the "space switch") having thirty-two input highways 12 and thirty-two output highways 13.

The input highways 12 are connected to respective time-division switching devices 14 (hereinafter referred to as the "input time switches"), only one of which is shown in the drawing. Each input time switch 14 is connected to the incoming sides of 256 line circuits (not shown), and is arranged to time-division muliplex together digital data from these circuits, so as to form a 256-channel T.D.M. (time-division multiplex) signal on the corresponding input highway 12. The time switch 14 is such that multiplexing can be performed in any selected order, so that data from any one of the line circuits can be written into any of the 256 time slots of the T.D.M. signal on the corresponding input highway 12.

The space switch 11 comprises a 32 × 32 matrix of crosspoint switches, adapted to interconnect any one of the thirty-two input highways 12 with any one of the thirty-two output highways 13, during any of the 256 time slots. It will thus be seen that the output from the space switch on each of the output highways 13 is therefore also a 256-channel TDM signal.

The output highways 13 are connected to respective time-division switching devices 15 (hereinafter referred to as the "output time switches"), only one of which is shown in the drawing. Each of the output time switches 15 is connected to the outgoing sides of 256 of the line circuits mentioned above, and is arranged to demultiplex the T.D.M. signal appearing on the output highway into the line circuits. The output time switch 15 is such that the demultiplexing can be performed in any selected order, so that data can be read from any one of the 256 time slots of the T.D.M. signal into any one of the 256 line circuits.

Hence, it will be seen that the switching system has a time-space-time switching configuration, and is capable of transferring data from the incoming side of any one of the line circuits into the outgoing side of any of the line circuits.

In this particular example, the multiplexing rate for the T.D.M. signals on the highways 12 and 13 is chosen to be 2.048 megahertz, so that a frame of 256 time slots recurs once every 125 microseconds. The data in the system is in the form of eight-bit words, and is transmitted over the highways 12 and 13 and through the space switch 11 in serio-parallel form, at a bit rate of twice the multiplexing rate, i.e. 4.096 megahertz. Thus, the highways 12, 13 are four-wire data paths, and each cross-point switch within the space switch 11 consists of four individual switching devices.

The setting up of a path through the system between any pair of line circuits is supervised by means of a switch control circuit 16, which is also operable to reserve such a path, without actually connecting it, as will be described.

Figure 2:
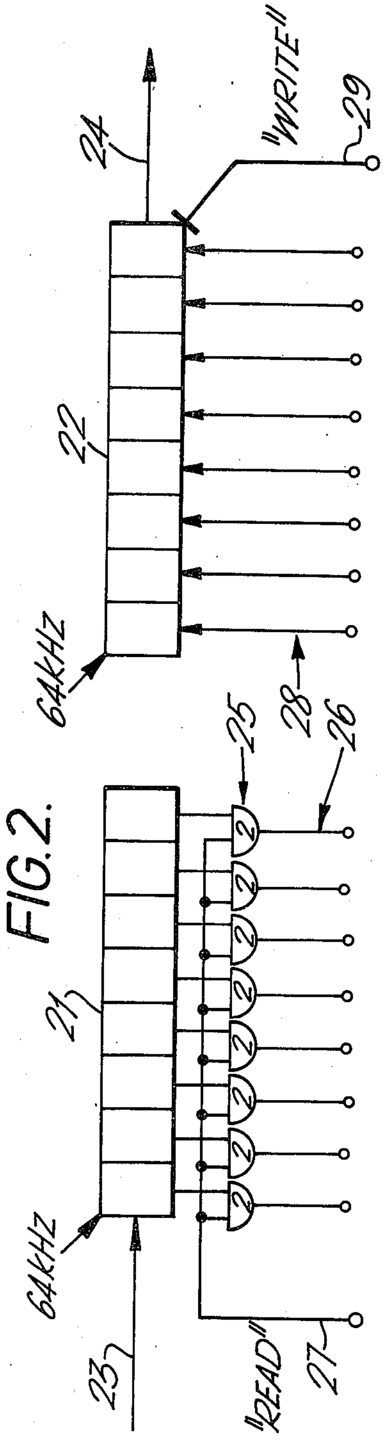
FIG. 2 is a schematic circuit diagram of a line circuit of the system.

Referring now to FIG. 2, this shows one of the line circuits referred to above. The incoming side of the line circuit comprises an eight-bit shift register 21, while the outgoing side comprises a similar register 22. Each of these registers 21, 22 is clocked by a 64 kilohertz clock signal, so as to cause its contents to shift one place to the right (as viewed in the Figure), at each clock pulse.

The line circuit is connected to an associated subscribers's station (not shown) by way of "send" and "return" wires 23 and 24. It is assumed, in this example, that the subscriber's station is a telex apparatus and that the signals on the wires 23, 24 are therefore two-state telex signals.

The telex signal on wire 23 is fed to the first stage of the register 21, where it is sampled by the 64 kilohertz clock signal, successive samples being clocked into successive stages of the register. The contents of the register 21 are transferred in parallel to the associated input time switch 14 (FIG. 1), as an eight-bit binary word, by way of a set of AND gates 25 and an eight-wire data highway 26, this transfer being initiated by means of a "read" pulse from the input time switch applied to a "read" wire 27. As will be explained, read pulses are applied to the line circuit every 125 microseconds, this being the time taken for eight bits to be clocked into the register 21.

In the return direction, eight-bit binary words appear, in parallel form, over an eight-wire highway 28 from the associated output time switch, and are clocked into the register 22 once every 125 microseconds, by means of a "write" pulse applied to a "write" wire 29 by the output time switch. The output of the last stage of the register 22 is applied to the "return" path 24.

Figure 3:
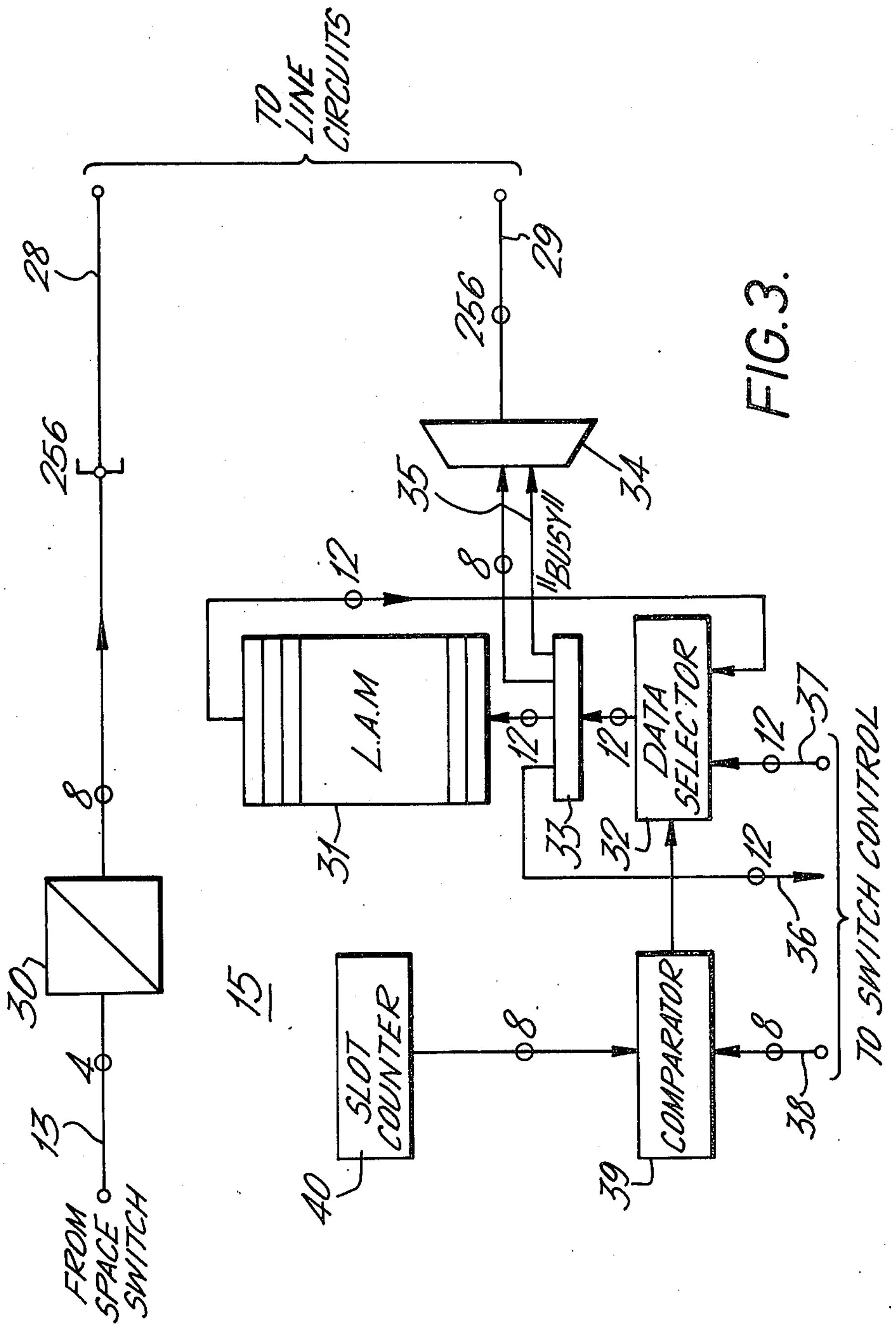
FIGS. 3 and 4 are schematic block circuit diagrams of various parts of the system of FIG. 1.

Referring now to FIG. 3, this shows one of the output time switches 15 of FIG. 1 in greater detail. The output time switch is connected to one of the output highways 13 of the space switch 11 in FIG. 1, and receives a 256-channel T.D.M. signal over this highway, as explained above. This signal is converted to eight-wire parallel form by means of a serio-parallel to parallel converter 30, and is then applied to the highway 28 (FIG. 2) of each of the 256 line circuits associated with the time switch.

The output time switch comprises a 256-stage shift memory 31 (referred to as the line address memory, or LAM) each stage of which contains a twelve-bit word. This memory 31 is clocked by means of a 2.048 megahertz clock signal, in synchronism with the time slots of the T.D.M. signal on highway 28, its contents thus being shifted upwards by one stage (as viewed in the drawing) at each clock pulse. The output from the last stage of the LAM 31 is normally fed back to the input of the first stage, by way of a data selector 32 and a twelve-bit input/output register 33 so that normally the contents of the memory 31 are circulated continuously.

Eight of the bits within each word of the memory 31 constitute a "line address." Another two of the bits are referred to respectively as the "busy" and "reserved" bits, the purpose of these bits being described below. Another bit is used as a parity check bit, for security purposes, while the remaining bit is not used, being "spare."

The eight line address bits of the word which is currently in the input/output register 33, as well as being returned to the memory 31, are also fed to the input of a decoder 34, which produces an output pulse on one of 256 output wires 34 according to the value of the address bits applied to it. The output wires 34 are connected respectively to the "write" wires 29 (FIG. 2) of the 256 line circuits associated with the time switch. The "busy" bit of the word which is currently in the register 33 is applied to a control input 35 of the decoder 34, and is used to enable the decoder when the "busy" bit is set to 1, but to disable the decoder when the "busy" bit is 0.

Operation of the time switch 15 is, as mentioned previously, controlled by the switch control unit 16 (FIG. 1). This control unit can read the contents of the input/output register 33 at any time, by way of a twelve-wire data path 36, and can also write data into any specified word of the LAM 31, as follows. The data which it is required to write into the LAM 31 is applied to a twelve-wire data path 37, while at the same time an eight-bit address, specifying which of the 256 words in the LAM is to be written into, is applied to an eight-wire data path 38. The address on path 38 is continuously compared, by means of a comparator circuit 39, with the output of an eight-stage binary counter 40, which is incremental by the 2.048 megahertz clock signal and therefore counts cylically from 0-255 in synchronism with the T.D.M. time slots and the shifting of the LAM 31. When the comparator 39 detects identity between the address on path 38 and the output of the slot counter 40, it produces an output pulse which is applied to the data selector 32, causing this selector to gate the data appearing on the path 37 into the register 33, in place of the data from the last stage of the LAM 31. This data will then pass from the register 33 into the appropriate word of the LAM 31.

The input time switches 14 are similar to the output time switches 15, and include a circulating shift memory similar to the LAM 31 in FIG. 3 and a decoder similar to the decoder 34. However, in the case of the input time switches, the outputs of the decoder, instead of being applied to the "write" wires 29 of the associated line circuits, are applied to the "read" wires 27. Moreover, there is no "reserve" bit in the circulating shift register. Furthermore, in an input time switch, the converter 30 (FIG. 3) is replaced by a parallel to serio-parallel (eight-wire to four-wire converter, the input of which is connected to the highways 26 (FIG. 2) from all the associated line circuits, and the output of which is connected to the associated input highway 12 of the space switch 11 (FIG. 1).

Each input time switch is controlled by the switch control unit 16 in exactly the same manner as described above from the case of an output time switch.

Figure 4:
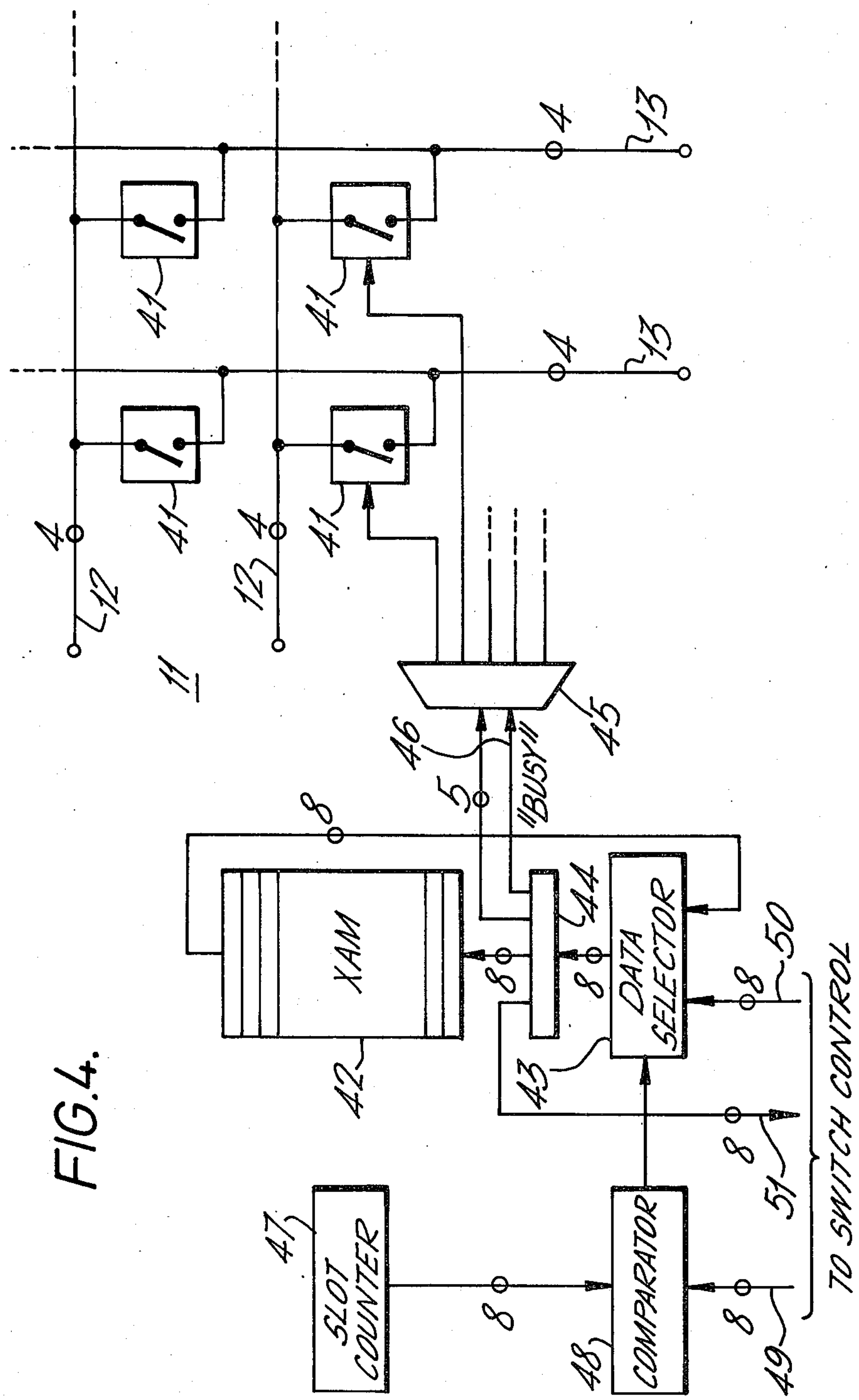

Referring now to FIG. 4, this shows the space switch 11 of FIG. 1 in greater detail.

As mentioned previously, the space switch comprises a 32 × 32 array of cross-point switches 41 (only four shown in FIG. 4), each of which is operable to interconnect one of the input highways 12 to one of the output highways 13. Each row of cross-point switches 41 has a 256-stage shift memory 42 associated with it, referred to as the cross-point address memory, or XAM. Only one such XAM is shown in the Figure. Each state of the XAM 42 contains an eight-bit word, five bits of which represent an address identifying one of the associated cross-point switches 41. One further bit is used as a "busy" bit, another is used as a parity check bit, and the remaining bit is a spare one. The XAM is clocked by a 2.048 megahertz clock signal, in synchronism with the time-slots on the highways 12, so that its contents are shifted upwards, as viewed in the drawing, by one stage at each clock pulse.

The output of the XAM is normally fed back to its input, by way of a data selector 43 and an input/output register 44, so that normally its contents are circulated continuously, each word appearing in the input/output register 44 once every 125 microseconds. The five address bits in the input/output register are decoded, by means of a decoder 45, and are used to address one of the thirty-two associated cross-point switches 41, causing that switch to be operated. The "busy" bit is also fed to a control input 46 of the decoder 45, so as to disable the decoder when it is set to 0.

Data can be written into, or read from, any selected word of the XAM, by means of the switch control unit 16 (FIG. 1) in a similar manner to that described for the output time switch in FIG. 3. For this purpose, the XAM is provided with a slot counter 47, which is clocked in synchronism with the XAM, and a comparator 48 which compares the output of the counter 47 with an eight-bit address applied to it from the switch control over an eight-wire data path 49. When the comparator 48 detects identity between its inputs, it operates the data selector 43 causing data to be read from an eight-wire data path 50, from the switch control, into the input/output register 44. The data in the register 44 can be read directly by the switch control, over an eight-wire data path 51.

The operation of the switch control unit 16 in setting up a connection from a first specified line circuit (L1) to a second specified line circuit (L2) will now be described.

First, the switch control unit inspects the contents of the line address memory of the input time switch associated with line circuit L1, and simultaneously inspects the contents of the line address memory of the output time switch associated with the line circuit L2 (by way of path 36 in FIG. 3), searching for a time slot in which both of these time switches are free. This is achieved by examining the "busy" bit in the input time switch and the "busy" and "reserve" bits in the output time switch and searching for a time slot in which all these bits are equal to 0.

When such a time slot is located, the switch control stores the address of this time slot. The switch control then uses this time slot address to write the address of line circuit L1 into the corresponding word of the LAM of the input time switch, to write the address of line circuit L2 into the corresponding word of the LAM of the output time switch, and to write the address of the appropriate cross-point switch 41 for connecting these time switches into the corresponding word of the appropriate XAM of the space switch. The "busy" bits of these words are, at the same time, all set to 1 (the "reserve" bit being left equal to 0).

This establishes the required connection between the specified line circuits L1 and L2. Thus, the input line circuit reads data from line circuit L1 onto the associated input highway 12 during the selected time slot, while the output line circuit writes data from the associated output highway 13, during the same time slot, into the line circuit L2, these highways 12 and 13 being interconnected during the selected time slot by the action of the XAM.

The setting up of a reserve path between two line circuits L1 and L2 is employed when for some reason other than path availability, a direct connection is not immediately possible. If, for example, the line signals at terminal L1 are incompatible with those at L2, where, say, one uses loop-disconnect and the other uses voice-frequency signalling, or again, where they use different telex signalling codes, the disparity is indicated by the identity of the calling and called line circuit addresses. A sender, compatible with the line signals at L2 is then supplied with the incoming signals and connected to the terminal L2 while the L1-L2 path is reserved.

After relaying the received signals the active sender path is cleared and the reserved path made active.

The operation of the switch control unit 16 in reserving a path between two line circuits L1 and L2 is identical to that described above for setting up a connection between those circuits, with one exception: the "busy"

bit in the LAM of the output time switch is not set to 1 but is left equal to 0, and instead the "reserve" bit is set to 1. Thus, data will not be written into the line circuit L2 during the selected time slot, since the decoder 34 (FIG. 3) will be inhibited during that time slot, by virtue of the "busy" bit still being equal to 0. However, although the "busy" bit is 0, the selected time slot cannot be used by the switch control unit for setting up another connection since, as mentioned above, the switch control also examines the "reserve" bit and interprets a "reserve" bit equal to 1, as a "busy" indication.

It should be appreciated that while such a path is reserved between line circuits L1 and L2, connection may still be set up to the line circuit L2 from some other line circuit, as in the case of the sender above, by way of a different path (using a different time slot), and likewise connection may still be made from line circuit L1 to some other line circuit.

The reserved path to line circuit L2 can be completed by the switch control unit, after the intermediate signalling function is completed, as follows. The switch control examines the contents of the LAM of the output time switch (by way of path 38 in FIG. 3), searching for the address of line circuit L2. When it locates this address, it re-writes the line circuit address in the same word of the LAM, setting the "busy" bit to 1 and the "reserve" bit to 0. The decoder 34 will now be enabled to read data from the selected time slot into the line circuit L2, thus completing the reserved connection.

It will, of course, be appreciated that the particular figures quoted in this specification, e.g. for the multiplexing rate, the number of line circuits served by each time switch, and the number of time switches associated with the space switch, are given by way of example only, and may be varied in other arrangements in accordance with the invention.

I claim:

1. A digital telecommunications switching system comprising:

a series of switching stages, a plurality of input channels connected to a first stage of said series of switching stages, a plurality of output channels connected to the last stage of said series of switching stages, control means connected to each of said switching stages for effecting a communication path through the switching stages, each switching stage comprising a switching memory containing a plurality of data words, each said data word containing an address determining an outlet from said stage, each said switching stage further comprising means for reading said data words cyclically, and decoding means for selecting an outlet from the switching stage in dependence upon the address contained in a data word currently being read out, each data word of a said plurality of data words in one of the stages of said switching memory containing, in addition to said address, a first data field controlling the operation of said decoding means and a second data field providing an indication to said control means of whether said associated outlet is free for the establishment of a said communication path thereto, said control means including means for writing into a selected said first field data preventing the operation of said decoding means, and consequent completion of a communication path to the associated outlet, and into the associated said second field data representing said associated outlet as busy, and means for over-writing the data in said first field and consequently enabling said decoding means and the completion of said communication path to said associated outlet.

2. A switching system according to claim 1, wherein said first field contains a single "busy" bit which enables or disables said decoding means according to the value of the busy bit, and said second field contains a single "reserve" bit which indicates that the associated outlet is busy or free according to the value of the reserve bit.

3. A switching system according to claim 2, wherein said one switching stage is the last of said switching stages and comprises a time-division switching circuit for receiving a time-division mulitplexed signal containing data from a plurality of said input channels time-division multiplexed together in respective time slots, there being a said data word stored in said switching memory and cycled in correspondence with said time slots in respect of each output channel for which an input channel signal is intended.

4. A switching system according to claim 3, wherein said series of switching stages comprises a time-division switching stage, a space-division switching stage and a time-division switching stage in sequence.

* * * * *